No. 671,084. Patented Apr. 2, 1901.
H. F. A. KLEINSCHMIDT & F. A. PHELPS, Jr.
ELECTRIC WELDING APPARATUS.
(Application filed Apr. 24, 1900.)
(No Model.) 2 Sheets—Sheet 1.

WITNESSES:
G. M. Powell.
B. M. Smith.

INVENTORS
H. F. A. Kleinschmidt,
F. A. Phelps, Jr.
BY Geo. H. Parmelee,
their ATTORNEY.

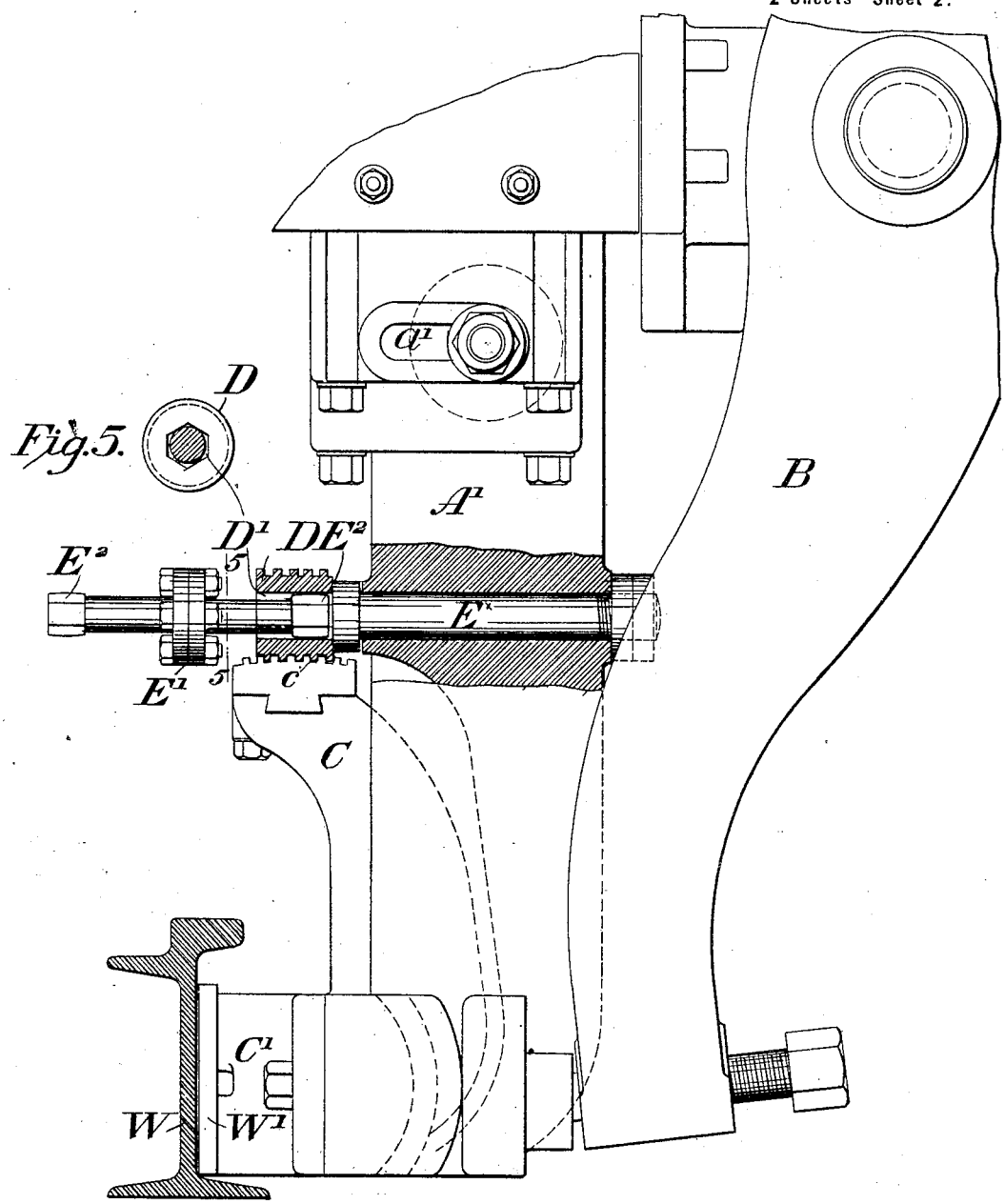

United States Patent Office.

HENRY F. A. KLEINSCHMIDT, OF JOHNSTOWN, PENNSYLVANIA, AND FREDERICK A. PHELPS, JR., OF NEWARK, NEW JERSEY, ASSIGNORS TO THE LORAIN STEEL COMPANY, OF PENNSYLVANIA.

ELECTRIC WELDING APPARATUS.

SPECIFICATION forming part of Letters Patent No. 671,084, dated April 2, 1901.

Application filed April 24, 1900. Serial No. 14,202. (No model.)

*To all whom it may concern:*

Be it known that we, HENRY F. A. KLEINSCHMIDT, of Johnstown, in the county of Cambria and State of Pennsylvania, and FREDERICK A. PHELPS, Jr., of Newark, in the county of Essex and State of New Jersey, have invented a certain new and useful Improvement in Electric Welding, of which the following is a full, clear, and exact description, reference being had to the accompanying drawings, which form a part of this specification.

This invention has relation to electric welding, and more particularly to apparatus of the type described and shown in the patent to Richard Eyre, dated April 12, 1898, for use in track-welding, although it may be found useful in connection with other electric welding machines and apparatus.

We have found that in making a weld joint between track-rails by means of side or splice bars (especially with wide bars) which are welded to the webs of the abutting rails there is, with the contacts heretofore used, a tendency for the bars and rails to heat more in one portion than in another, so that one portion is brought to a welding heat in advance of the other portions. This lack of uniformity of heating is of course a serious detriment to the operation and the character of the resulting weld, and it is highly desirable to provide means by which it may be overcome.

The object of our invention is therefore mainly to provide means whereby the entire area of the welding-surfaces may be uniformly heated. We accomplish this object by a peculiar construction and arrangement of the terminal clamps or contacts through which current and pressure are applied to the parts to be welded, whereby the points of contact and application of pressure may be shifted to any desired portion between the head and foot of the rails. If, therefore, in making a particular weld there is noticed a tendency for the parts to heat more rapidly, say, toward the heads of the rails than toward their feet, it may be readily counteracted by shifting the points of greatest contact toward the feet of the rails. In this manner we are able in all cases to produce a substantially uniform welding heat throughout the entire welding area.

Our invention also consists in the novel construction and combination of parts, all as hereinafter described, and pointed out in the appended claims.

Figure 1:
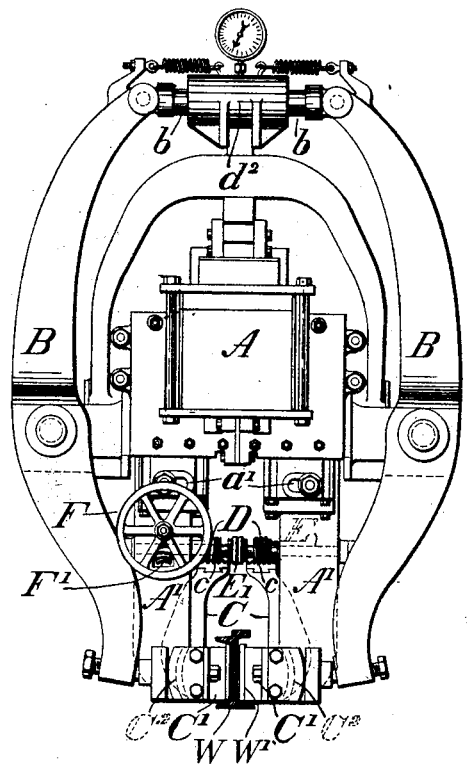
Figure 2:
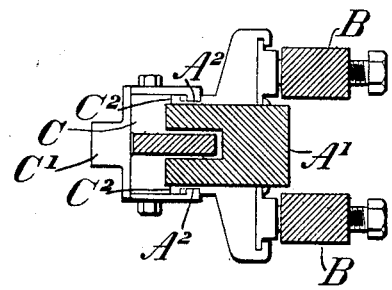
Figure 3:
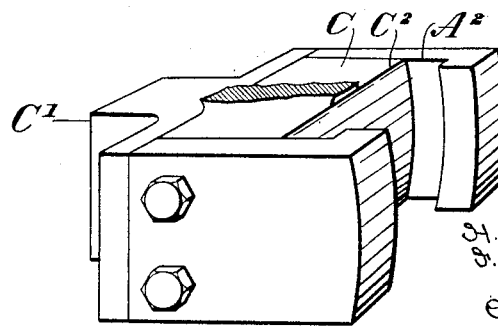

In the accompanying drawings, forming a part of this specification, Figure 1 is a side view of that portion of an electric welder to which our improvements relate; and Fig. 2 is a detail view, in transverse section, showing the manner in which the contact devices are carried by the terminal legs of the welder. Fig. 3 is a detail perspective view showing the lower portion of one of the arms C. Fig. 4 is a detail view, on a larger scale, partly in vertical section and partly in side elevation. Fig. 5 is a section on the line 5 5 of Fig. 4.

The apparatus shown in Fig. 1 is in general similar to that shown in Fig. 6 of the patent above referred to, A being a stationary transformer having the terminal legs A', and B the pivoted clamping-arms, which engage the backs of the terminals to apply pressure thereto and which are actuated by plungers $b$, moving in a power-cylinder $d^2$.

The legs A' are adjustably pivoted at $a'$ and are recessed on their inner faces to receive arms C, arranged upon opposite sides of the joint to be welded and carrying the welding-contacts C' at their lower ends. Each of said arms is provided at its upper end with worm-teeth $c$, which are engaged by a worm D. The two worms are carried on a shaft E, having its bearings in the legs A' and formed in two sections united by an insulating-coupling E'. The portions $E^\times$ of the shaft which carry the worms are also formed in separate sections, to which the worms are rigidly secured. These worms are formed with angular sockets or openings D', and the main sections of the shaft have angular heads $E^2$, which engage said sockets or openings to form a rigid connection with the sections $E^\times$ in so far as circular movement is concerned, but to permit endwise movement of the sections $E^\times$ on the heads $E^2$ under pivotal movement of the legs A'.

F is a hand-wheel whose shaft has a worm-gear connection F' with the shaft E. The rear faces of the lower portion of the arms C are rounded, as indicated at $C^2$, and are provided with concave bearings at $A^2$ on the lower portions of the legs A', so that as the upper ends of the arms are moved the effect upon the contacts is a pivotal movement about imaginary centers located between their working faces. The construction just described also serves to hold the arms C in position to maintain the engagement with the worms D, since the shape of the bearings for said arms prevents the same from dropping away from the said worms.

W designates a rail to which the splice-bars are to be welded, and W' indicates the splice-bars.

It will be readily seen that if the hand-wheel F is actuated in one direction the upper ends of the arms C will be separated, causing their lower ends to turn on their bearing from the positions shown in Fig. 1 to positions wherein the maximum pressure upon the splice-bars is below the center line of the rail-web, the exact lines of such pressure depending upon the extent to which the hand-wheel is operated. A reverse movement of said wheel will move the upper ends of said arms toward each other and shift the pressure of the contacts to portions of the splice-bars above the center line of the rail-web. In this manner the heating effect of the current can be accurately controlled and uniform heating is obtained.

It is obvious that other mechanical devices may be employed in lieu of the worm-gear shown for actuating the arms C and that changes may be made in other mechanical details of construction and arrangement without departing from the spirit and scope of our invention. Hence we do not wish to be limited to the specific embodiment thereof which we have herein shown and described.

Having thus described our invention, what we claim, and desire to secure by Letters Patent, is—

1. In electric welding apparatus, the combination with contacts arranged to bear against opposite sides of the parts to be welded, of means for actuating said contacts to shift their points of engagement with said parts with respect to the center lines thereof.

2. In electric welding apparatus, the combination with a pair of contacts forming opposite terminals of the welder, and means for applying pressure thereto, of means for actuating said contacts to shift vertically their places of engagement with the parts to be welded.

3. In electric welding apparatus, a pair of terminal contacts, and means for actuating the same to cause certain portions of the working faces thereof to approach each other, and other portions thereof to recede from each other without breaking the circuit therethrough.

4. In electric welding apparatus, a pair of terminal contacts, and means for effecting a pivotal movement of said contacts to shift their places of engagement with the parts to be welded without breaking the circuit therethrough.

5. In electric welding apparatus, a pair of arms movable toward and away from each other, contacts carried by the said arms, and bearings tending to give said contacts a pivotal movement as the arms are moved toward and away from each other.

6. In electric welding apparatus, the combination with a pair of contact-carrying arms having bearings at one end against relatively stationary members of the apparatus, and means for moving the opposite end portions of said arms toward and away from each other.

7. In electric welding apparatus, a pair of movable arms, terminal contacts at the lower end portions thereof, relatively-fixed bearings for the contact ends of said arms and means for moving the upper end portions of said arms toward and away from each other.

8. In electric welding apparatus, the combination of a pair of movable arms, a contact-piece carried by each arm, relatively-fixed bearings for the lower end portions of said arms, and worm-gear for actuating said arms.

9. In electric welding apparatus, the combination with the terminal legs and means for applying pressure thereto, of the movable contact-carrying arms having bearings in said legs at or near one end portion thereof and means for moving the upper opposite end portions of said arms toward and away from each other.

10. In electric welding apparatus, the combination with the pivoted terminal legs, and means for applying pressure thereto, of the contact-carrying arms in recesses of the said legs, contacts carried by said arms at one end portion thereof, and means for moving the opposite end portions of said arms toward and away from each other, said arms having bearings against the said arms at the contact ends thereof.

11. In electric welding apparatus, the combination with the pivoted terminal legs, and means for applying pressure thereto, of the contact-carrying arms movably seated in the said legs, contacts carried by the said arms at their lower ends, worm-teeth on the upper ends of said arms, a shaft having worms engaging said teeth, and means for actuating the said shaft.

12. In electric welding apparatus, the combination with the pivoted terminal legs, and means for applying pressure thereto, of the contact-carrying arms movably seated in recesses of the said legs, contacts carried by the said arms at their lower ends, worm-teeth on the upper ends of said arms, a shaft having worms engaging said teeth and means for actuating the said shaft, said shaft being formed in two sections having an insulating connection intermediate the said arms.

In testimony whereof we have affixed our signatures in presence of witnesses.

H. F. A. KLEINSCHMIDT.
  FREDERICK A. PHELPS, Jr.

Witnesses as to signature of H. F. A. Kleinschmidt:
 JOHN H. KENNEDY,
 H. W. SMITH.

Witnesses as to signature of Frederick A. Phelps, Jr.:
 WINSLOW ZELIFF,
 A. BELL MALCOMSON, Jr.